United States Patent
Bach

[11] 3,720,459
[45] March 13, 1973

[54] OPTICAL SYSTEM WITH CONTINUOUS FILM TRANSPORT

[76] Inventor: Guy Roger Jules Bach, 58 Grande Rue, Neufmontiers-les-Meaux, France

[22] Filed: March 31, 1971

[21] Appl. No.: 129,917

[30] Foreign Application Priority Data

April 1, 1970 France..............................7011696
March 5, 1971 France..............................7107732

[52] U.S. Cl.............................352/113, 352/116
[51] Int. Cl.............................................G03b 41/04
[58] Field of Search......352/105, 106, 113, 114, 115, 352/116, 118, 119, 120

[56] References Cited

UNITED STATES PATENTS

| | | | |
|---|---|---|---|
| 2,455,789 | 12/1948 | Luboshez | 352/116 |
| 1,818,410 | 8/1931 | Leventhal | 352/119 |
| 2,323,512 | 7/1943 | Bamford | 352/115 |
| 1,443,672 | 1/1923 | Bauersfeld | 352/106 |
| 1,356,787 | 10/1920 | Porter | 352/116 |
| 1,618,090 | 2/1927 | Jenkins | 352/116 |
| 1,956,736 | 5/1934 | Thun | 352/118 |
| 1,154,835 | 9/1915 | Bauersfeld | 352/105 |
| 2,647,437 | 8/1953 | Bentley et al | 352/113 X |
| 1,690,770 | 11/1928 | Continsouza et al | 352/115 |

FOREIGN PATENTS OR APPLICATIONS

| | | | |
|---|---|---|---|
| 279,040 | 11/1928 | Great Britain | 352/116 |
| 982,400 | 1/1954 | France | 352/118 |
| 1,153,285 | 9/1957 | France | 352/116 |

Primary Examiner—Samuel S. Matthews
Assistant Examiner—Alan A. Mathews
Attorney—Karl F. Ross

[57] ABSTRACT

A motion-picture camera or projector has a continuously moving film transporter adjacent one or more light-ray deflectors operating in synchronism therewith, each deflector including at least one fully or partly transparent disk with mutually inclined sides generally perpendicular to the path of a beam transluminating the film, advantageously in a zone where the rays of the beam are parallel. At the instant when a frame of the film is centered on the optical axis, the disk or disks are so positioned that the exciting beam section is in line with the entering beam section; at other instants the two beam sections are relatively deflected, in a direction parallel to the line of film movement, to compensate for the offset of the frame from the optical axis. With a single disk per deflector, the beam successively passes with intervening ray transposition through a pair of conjugate peripheral disk portions; alternately, a deflector may consist of a pair of counterrotating disks with overlapping peripheral portions interposed in the beam path. The optically effective disk portions may form one or more prismatic faces periodically intercepting the beam; with two or more deflectors positioned in cascade, their speeds or the number of their faces may be inversely related in a binary series.

12 Claims, 34 Drawing Figures

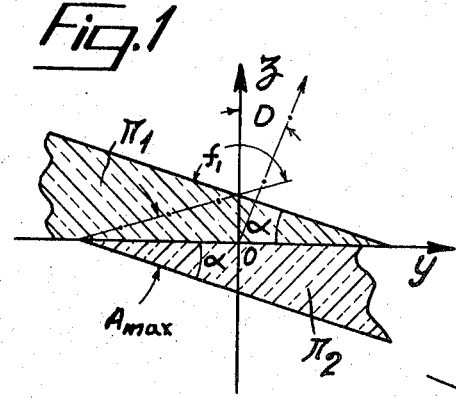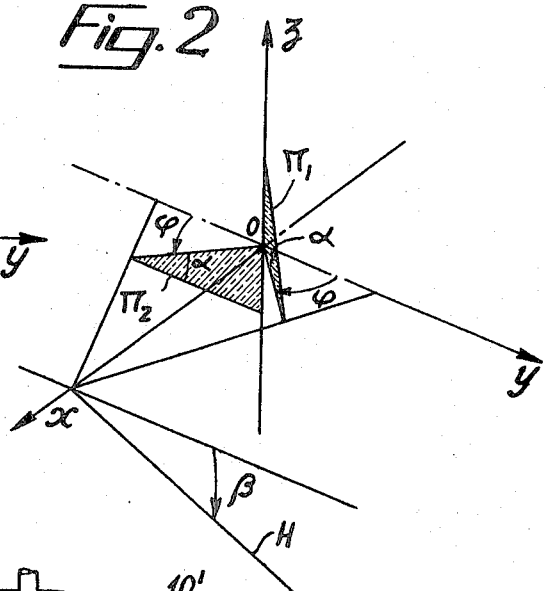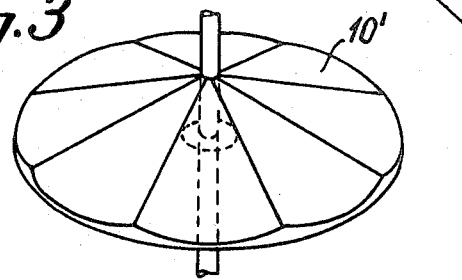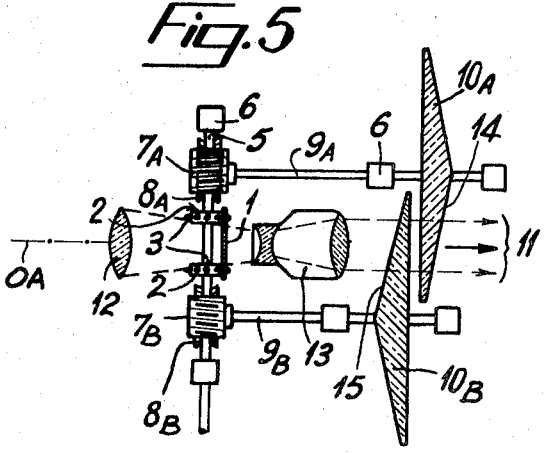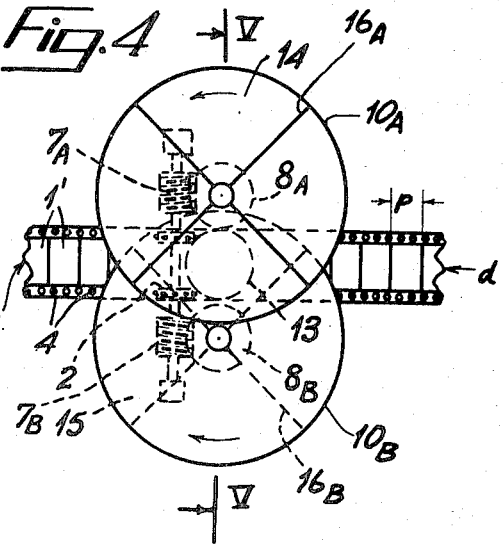

Guy R. J. Bach
Inventor.

By Karl F. Ross
Attorney

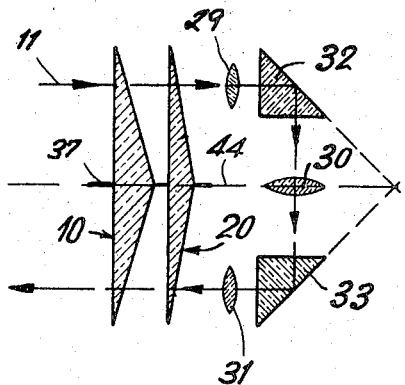
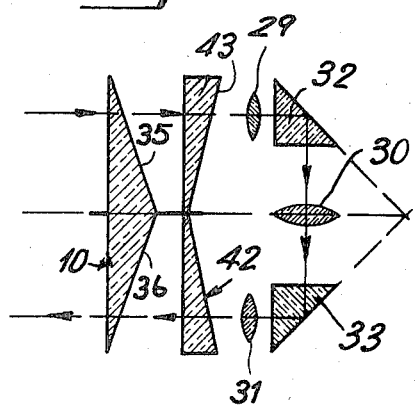
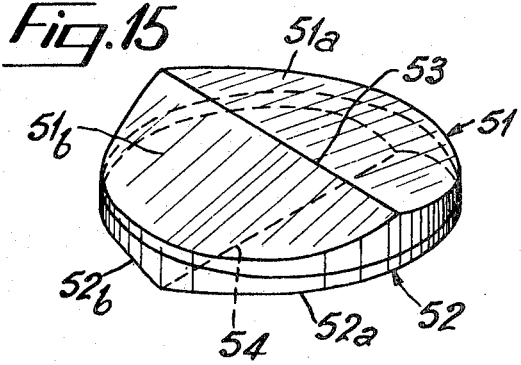
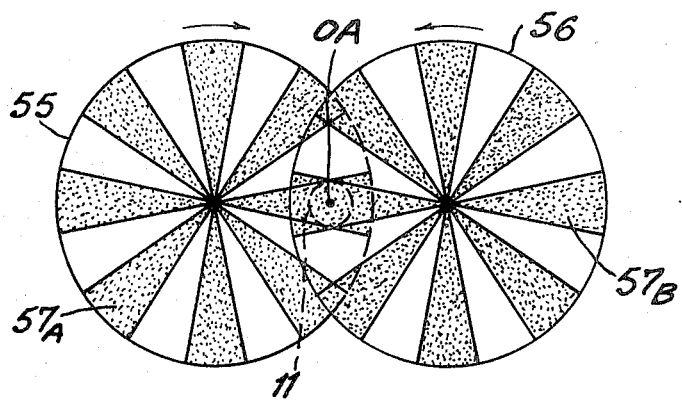

Guy R. J. Bach
Inventor.

By Karl F. Ross
Attorney

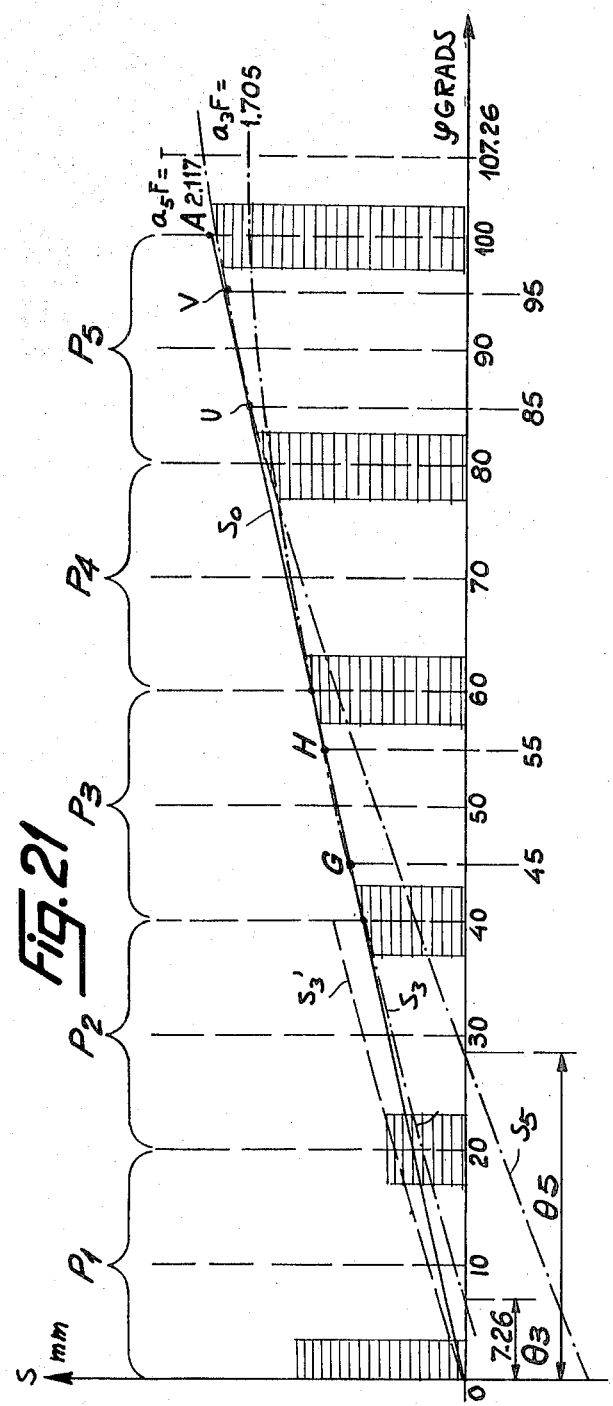
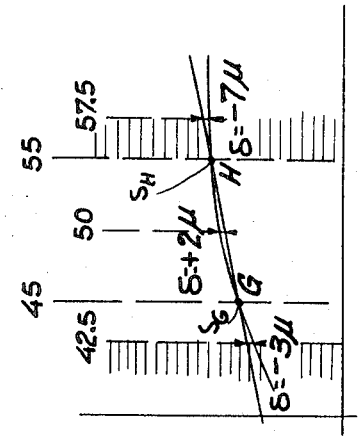

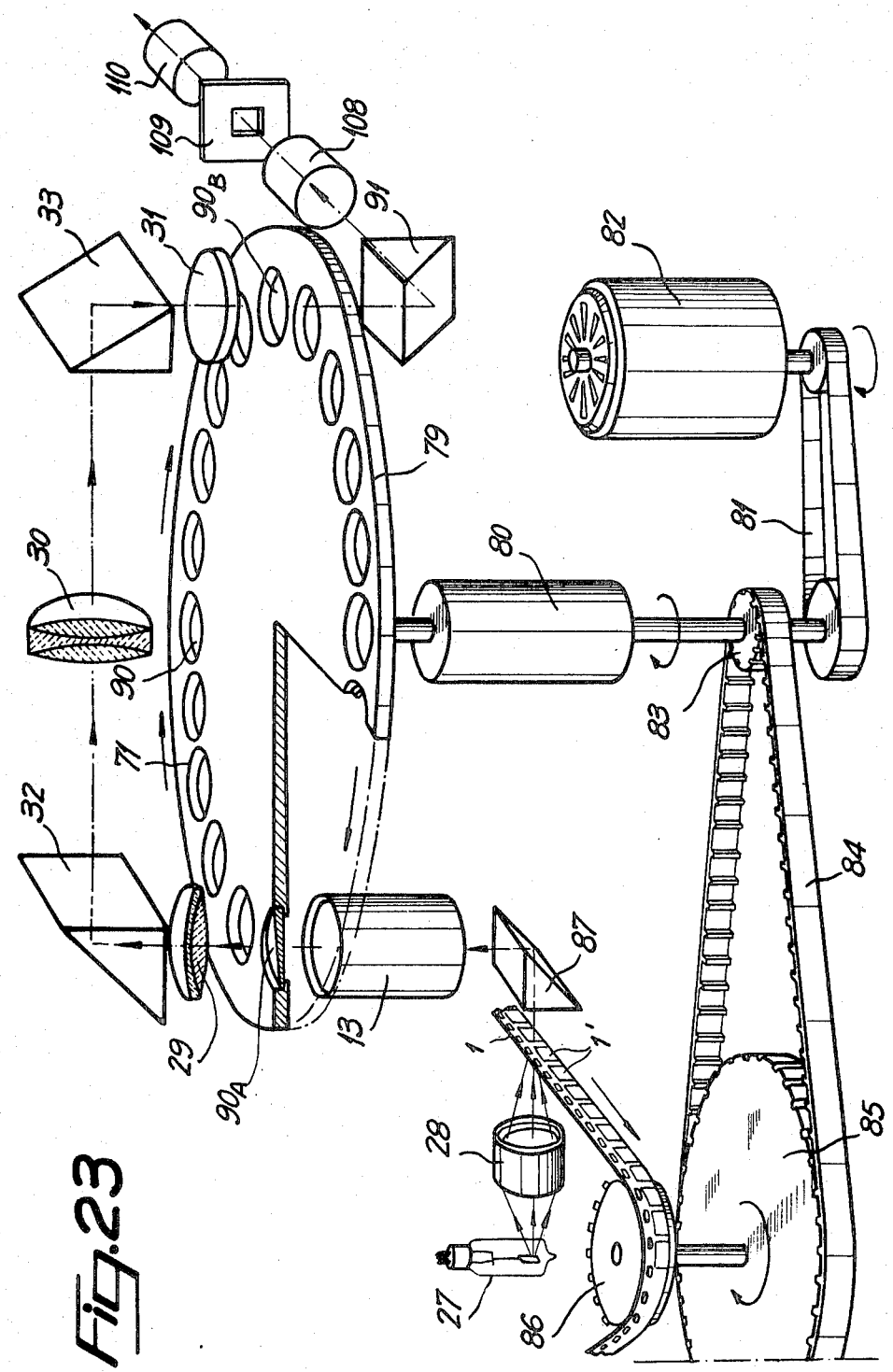

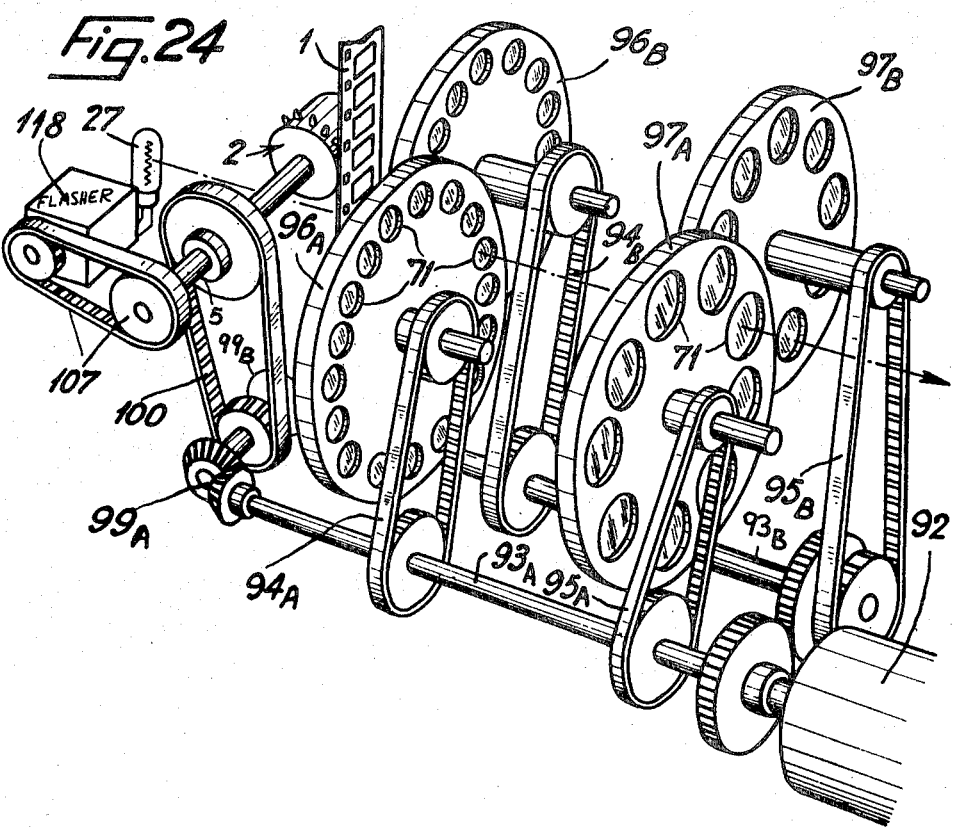
Fig. 24
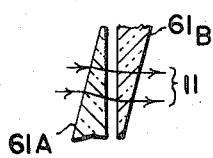
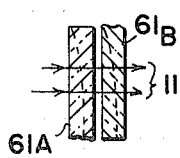
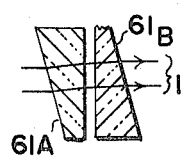
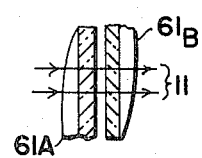
FIG. 25a    FIG. 25b    FIG. 25c    FIG. 25d
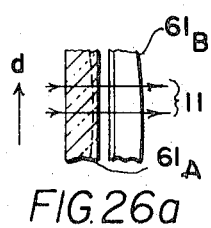
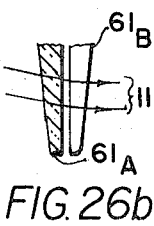
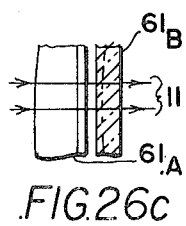
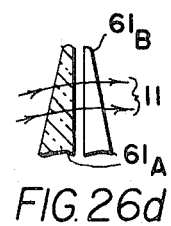
FIG. 26a    FIG. 26b    FIG. 26c    FIG. 26d

OPTICAL SYSTEM WITH CONTINUOUS FILM TRANSPORT

My present invention relates to an optical system for the taking or the projection of motion pictures.

Motion-picture cameras and projectors employ an intermittent film transport periodically advancing the film by a distance corresponding to the center-to-center spacing of successive frames; the film is halted, for a small fraction of a second, in a position in which the center of a frame is aligned with the axis of a light beam focused thereon. This continuous feeding generates stresses and strains which tend to damage the film and give rise to other mechanical problems that require, as a rule, constant supervision by an operator.

The term "frame," as is well understood in the art, refers to a generally rectangular section of film designed to receive the latent image during picture taking or carrying the developed image during projection.

Attempts have been made to utilize a continuously moving film transport in combination with optical means compensating for the relative shifting of the frame and the objective axis during the finite period required for exposure or projection. Prior systems of this type, employing camcontrolled optical elements such as mirrors, prisms or lenses, have been relatively cumbersome and only of limited accuracy.

It is, therefore, the general object of my present invention to provide an improved motion-picture camera or projector with continuous film transport which avoids the drawbacks of earlier arrangements.

This object is realized, pursuant to the present invention, by the provision of a progressively variable beam deflector interposed in the path of the light rays focused by the objective onto the film, this deflector including one or more rotatable disks with sides generally perpendicular to the objective axis and with at least two conjugate transparent peripheral portions positioned for successive transversal by the beam; the disk or disks are driven in synchronism with the film transport to make a full revolution during a whole number of frame periods and are each provided with at least one side which is inclined at different angles to the beam path in different rotary positions thereof whereby an exiting beam section is deflected to a varying extent, relative to the optical axis, in a peripheral direction of the disk which parallels the line of movement of the film along its track. The angular swing of the inclined disk side or sides is so chosen as to make the deflection of the exiting beam section substantially equal to the offset of a frame from the optical axis in different positions of the continuously moving film.

The term "frame period," as used above, denotes the time required to pass from the centered position of one frame to that of the next-following frame; in practice, for normal exposure and projection, the film may advance at a rate of 24 frames per second.

If the deflector comprises but one disk, the two transparent portions successively traversed by the beam are advantageously constituted by diametrically opposite parts of that disk, autocorrelation means being provided for reflecting the beam back toward the disk after its first traversal and for transposing its rays with reference to the disk axis so as to provide zero shifting in a predetermined disk position which is symmetrical with respect to the beam path. Alternatively, I may use two paired, counterrotating disks of like speed with overlapping marginal regions which represent the conjugate transparencies. The single disk or the pair of counterrotating disks may be duplicated to form two or more cascaded deflector stages to correct for departures from linearity; as more fully discussed below, the stages may introduce beam deflections of alternate sign following a sinusoidal law and representing consecutive terms of a Fourier transform of a linear function of time.

The optically active portion of each disk — with the possible exception of those assigned to the even-numbered (negative) terms of a Fourier series — consists of one or more prismatic faces which may be located on the same side or on opposite sides of the disk. With a plurality of active faces per disk, the latter may rotate through only a fraction of a revolution during each frame period. In such a case, the rates of rotation of a first-stage and a second-stage disk (or pair of disks) may be so interrelated, pursuant to the aforementioned Fourier transform, that each second-stage disk face moves past the optical axis in half the time required for a movement of each first-stage disk face past the axis.

In a particularly advantageous embodiment, each disk may have an opaque body provided with a plurality of peripherally equispaced cutouts receiving prismatic inserts which constitute the active transparencies and which are preferably of dihedral shape. A group of peripherally consecutive inserts, positioned to register with the optical axis during a single frame period, may differ in their dihedral angles and in their angular orientation relative to corresponding disk radii to approximate a linear shift characteristic.

The continuously rotating disk or disks of my improved beam deflector have a speed-dependent flywheel effect tending to stabilize the operation of the film transport mechanically coupled therewith. With the assumed feed rate of 24 frames per second, the rotary disk speed will be 1440 RPM or an aliquot fraction thereof, depending on the number of active faces per disk.

Naturally, additional flywheel-type stabilizers could be mounted directly on the drive shaft of the film-feeding sprocket or sprockets. The film may be held onto these sprockets by being looped about elastically tensioned idler rollers, as is well known per se, to maintain a steady engagement in the presence of possible transmission vibrations. The disk or disks and the film transport could also be synchronized by an electronic rather than mechanical coupling.

The above and other features of my invention will be described in detail hereinafter with reference to the accompanying drawing in which:

FIG. 1 is a somewhat diagrammatic cross-sectional view of a pair of relatively rotatable prisms to be used as part of a beam deflector in a system according to my invention;

FIG. 2 is an isometric diagram showing the prism sections of FIG. 1 in a different angular position;

FIG. 3 is a perspective view of a refractive body adapted to be used in my improved beam deflector;

FIG. 4 is a face view of part of a motion-picture projector embodying my invention;

FIG. 5 is a cross-sectional view taken on the line V — V of FIG. 4;

FIGS. 13 and 14 are two diagrammatic views generally similar to FIG. 12, showing respective modifications;

FIG. 15 is a perspective view of another refractive body adapted to be used in my improved deflector;

FIG. 16 is a view similar to FIG. 8, showing a modified shutter pair;

FIG. 21 is a graph relating to the system of FIGS. 19 and 20;

FIG. 22 shows a vertically expanded portion of the graph of FIG. 21;

FIG. 23 is a perspective view of another autocorrelation system according to the invention embodying features of FIGS. 19 and 20;

FIG. 24 is a perspective view of a two-stage variant of the embodiment of FIGS. 19 and 20;

FIGS. 25a – 25d are fragmentary sectional views showing different relative positions of two of the deflecting elements of FIG. 17, taken on the line XXV — XXV thereof;

FIGS. 26a — 26d are corresponding views of the same elements, taken on the line XXVI — XXVI of FIG. 17;

FIG. 27 is an enlarged cross-sectional view taken on the line XXVII — XXVII of FIG. 18, in a different operating position; and FIG. 28 is a side view of a modified deflector stage.

Figure 6:
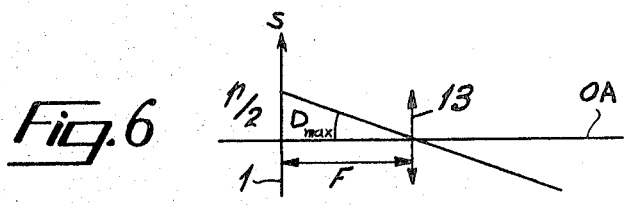
FIGS. 6 and 7 are two explanatory graphs.

Reference will first be made to FIGS. 1 and 2 showing a pair of relatively rotatable prisms $\pi_1$, $\pi_2$ turning on a common axis z which is perpendicular to their adjoining faces in the plane xy. In practice, these faces may be spaced apart rather than contacting each other as shown.

In the relative position of the prisms illustrated in FIG. 1, their external faces $f_1$, $f_2$ are parallel to each other so that a beam of light generally parallel to axis z traverses the prisms with a certain lateral shift but without angular deflection. In a diametrically opposite relative position of the prisms, in which the face $f_1$ includes an angle $A_{max}$ with face $f_2$ as indicated in dot-dash lines, the prisms constitute an optical wedge which deflects an incoming beam toward the right as viewed in that Figure. In intermediate relative positions, such as the one shown in FIG. 2, the composite prism will have an apex angle A which is greater than zero but less than $A_{max} = 2\alpha$ where $\alpha$ is the apex angle of each individual prism $\pi_1$, $\pi_2$.

In FIG. 2 the axis y represents the line of reference for the measurement of an angle $\phi$ of rotation about the origin 0, the two prisms counterrotating at the same speed. It can be shown that, under these conditions, $$\sin(A/2) = \sin\alpha \sin\phi \qquad (1)$$

which, for $\alpha \ll 1$ (in radians), can be written $$A \approx 2\alpha \sin\phi \qquad (1')$$

In first approximation, given a refractive index n for the glass or other transparent material of the two prisms, the angle of deflection D can be expressed by $$D = (n-1)A = 2(n-1)\alpha \sin\phi \qquad (2)$$

This deflection D is symmetrical for equal and opposite angles $+\phi$ and $-\phi$.

With the film moving at constant speed, the angle of rotation $\phi$ is a linear function of time; the angle of deflection D, however, is a sinusoidal function which approaches linearity only for very small values of $\phi$.

Several measures, described in detail hereinafter, may be used separately or jointly to keep the effective angle within a range of quasi-linearity. These measures include the use of a multifaceted disk forming a plurality N of peripherally spaced prism faces; the provision of a shutter or a partly opaque disk body to obstruct the light beam during part of a revolution of the prisms; and/or (in the case of a projector) the utilization of a flashing light source to illuminate the film only during a fraction of a frame period.

With N prism faces the maximum angle of rotation $\pm\phi_{max}$ reduces to $\pm\pi/N$; for sufficiently large values of N (e.g. N=8) we can equate $\sin\phi$ and $\phi$ so that equation (1) is further simplified to $$A \approx 2\alpha\phi \qquad (1'')$$

whence $$D \approx 2\alpha(n-1)\phi \qquad (2')$$

FIG. 3 shows a transparent disk 10 formed on its upper surface with eight contiguous prism faces each subtending an angle of 45° or 50 grads. Such a disk may be used, singly or paired with a counterrotating identical disk, in a beam deflector as more fully described hereinafter. With the use of simpler and therefore more easily manufactured disks of only a few faces, one or more of the aforedescribed other measures may be relied upon to restrict the effective angular range.

Although shown as a unitary body, the disk 10 and other disks described hereinafter may be of the compound type, i.e. cemented from glasses of different refractivity and Abbe numbers to reduce chromatic aberrations.

In FIGS. 4 and 5 I have shown the essential parts (other than its housing and its drive motor) of a motion-picture projector comprising a pair of counterrotating disks $10_A$, $10_B$ each generally similar to disk 10 of FIG. 3 but provided, as shown in FIG. 4, with only four faces. The disks are mounted on a pair of parallel shafts $9_A$, $9_B$ symmetrically disposed with reference to the optical axis $0_A$ of an objective 13 whose image-side focal plane coincides with a film 1 divided into a succession of frames 1'. Light from a source not shown in these Figures is concentrated by a lens 12 upon the film 1 to transluminate it and to form a telecentric beam 11 (i.e. a bundle of parallel light rays) beyond the objective 13; the disks $10_A$ and $10_B$ are disposed in the region of these parallel light rays in order to minimize astigmatic aberration and to provide a zone of suitable length for the insertion of the one or more stages of deflecting disks and possible ancillary equipment, e.g. a separate pair of counterrotating shutters.

Bearings 6 support the disk shafts 9A, 9B as well as a transverse shaft 5 carrying a pair of feed sprockets 3 for the advance of the film 1, these sprockets forming part of a transport mechanism 2 and engaging in marginal perforations 4 of the film 1. Two oppositely threaded worms $7_A$, $7_B$ on shaft 5 mesh with respective worm gears $8_A$, $8_B$ on shafts $9_A$, $9_B$ to synchronize the rotation of the disks $10_A$, $10_b$ with the continuous advance of the film 1. In the illustrated relative position of the disks, their overlapping marginal peripheral regions traversed by the beam 11 have their outer faces 14, 15 parallel to each other so that the beam undergoes no deflection in the direction parallel to the line of film motion $d$ (FIG. 4) and only a slight transverse displacement in a plane perpendicular thereto, as seen in FIG. 5. In this position the median radii of the active disk faces are aligned and perpendicular to the direction $d$. The advance of the film toward the left (as viewed in FIG. 4) tends to displace the projected image of the transluminated frame in the opposite direction, yet the concurrent rotation of the disks $10_A$ and $10_B$ in the indicated sense (disk $10_A$ counterclockwise, disk $10_B$ clockwise) compensates this deviation by a countervailing deflection of the light rays. When, after a rotation of 25 grads, the edge $16_A$ or $16_B$ between two adjoining faces passes the optical axis 0A (see FIG. 8), the deflection of the beam by the counterrotating prisms is reversed even as a new frame enters the field of view. In the neighborhood of the transition point, however, two adjoining prism faces of each disk are simultaneously struck by the beam so that a spurious double picture would appear at this instant if the beam were not obstructed or interrupted during the passage of the edge across its path.

Figure 17:
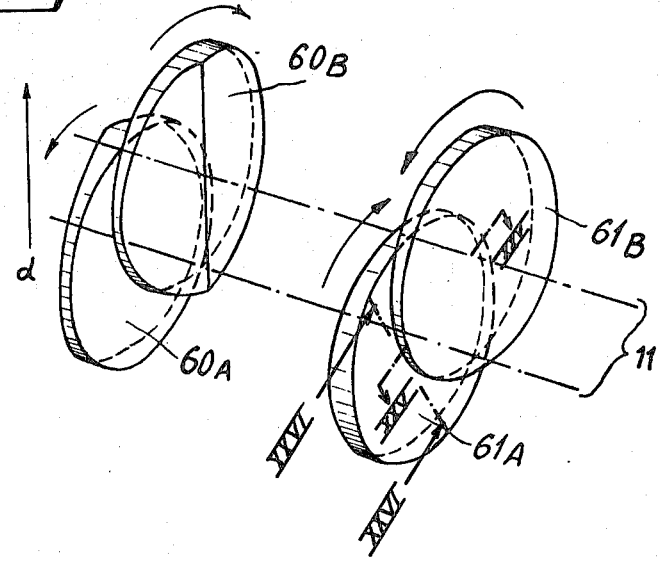
FIG. 17 is a diagrammatic perspective view of a further two-stage deflector embodying my invention.

FIGS. 25a – 25d and 26a – 26d diagrammatically illustrate the deflection of the beam in four different relative positions of a pair of disks $61_A$, $61_B$ of the type shown in FIG. 17, i.e. with only one prism face per disk; in this case, of course, each disk rotates through a full 360° or 400 grads during a frame period, i.e. in the course of an advance of the film 1 by a distance $p$ (FIG. 4) representing the height of each frame 1' or the center-to-center spacing of two adjoining frames.

In FIGS. 25a and 26a the disks $61_A$, $61_B$ have the same relative position, with reference to each other and to the beam 11, as the disks $10_A$ and $10_B$ in FIGS. 4 and 5. In this position the beam is slightly shifted in a transverse direction (FIG. 25a) and undeflected in the plane of film movement $d$. A quarter-turn later, in the position of FIGS. 25b and 26b, the disks form a composite prism or wedge which is optically ineffectual in the transverse plane but deflects the beam in the direction of movement $d$ to compensate for the frame movement. After the disks have moved through another quadrant, there occurs again a transverse shift (FIG. 25c) but no deflection in the plane of travel (FIG. 26c). After a further quarter of a revolution, as shown in 25c and 26d, the beam is unshifted in the transverse plane but deflected in a sense opposite the direction of advance $d$ to compensate for the offset of the new frame. Actually, of course, the beam should be suppressed from a point somewhat ahead of the position of FIGS. 25b, 26b to a point somewhat beyond the position of FIGS. 25d, 26d.

The transverse shifting of the parallel light rays (FIGS. 25a and 25c) is optically insignificant, yet a minor distortion occurs as the result of a slight tilting of the apex H (FIG. 2) of the composite prism $\pi_1$, $\pi_2$, with reference to the plane $xy$, by an angle $\pm \beta$ given by $$\tan\beta = -\tan\alpha \cos\phi \qquad (3);$$

since $\alpha$ is assumed to be small, and since $\phi$ has only a limited range, the variation $d\beta/d\phi = \tan\alpha\sin\phi$ is slight and manifests itself only in a negligible curving of the lines which are parallel to lines of separation of adjoining frames, i.e. transverse to the direction of motion $d$.

If the system of FIGS. 4 and 5 were part of a camera rather than a projector, the objective 13 would be positioned to the right of disks $10_A$ and $10_B$ (as viewed in FIG. 5) and the light would come from that direction.

The transmission ratio of gears $7_A$, $8_A$, $7_B$, $8_B$ and the mounting of the disks $10_A$, $10_B$ on their shafts $9_A$, $9_B$ are so chosen that a frame 1' is exactly centered on axis 0A when the system is in the position of FIG. 4 (corresponding to that shown in FIGS. 25a and 26a), the film advancing by a distance $4p$ for every disk revolution.

FIG. 6 shows the maximum angular deflection $D_{max}$ which would have to be compensated if the picture were to be maintained for a full transition from a starting position to a final position located at distances $\pm p/2$ from the optical axis 0A. As will be apparent from that Figure, deflection $D_{max}$ is given by $$\tan D_{max} = \pm p/2F \qquad (4)$$

where F is the focal length of the objective 13. From equations (1) and (2) we obtain $$\sin\alpha = \frac{\sin\frac{A}{2}}{\sin\varphi} = \frac{\sin\frac{D}{2(n-1)}}{\sin\varphi} \qquad (5)$$

With a refractive index $n$ approximating 1.5, equation (5) reduces to $$\sin\alpha = \sin D/\sin\phi \approx p/2F \sin\phi_{max} \qquad (5')$$

since $\tan D \approx \sin D$.

In the usual 35 mm film, $p = 19$ mm; if we assume an objective with a focal length $F = 100$ mm, equations (4) and (5') yield $$\sin\alpha = 19/100\sqrt{2} = 0.134$$

for a maximum angle of rotation $\pm\phi_{max} = \pi/4$.

On the other hand, the angular deviation $\Delta$ (in radians) due to the movement of the image frame is a linear function of time, and therefore of the angle of rotation $\phi$, given by $$\Delta = 2p\alpha/\pi F \qquad (6)$$

With the assumed value of $n \approx 1.5$, and with $\alpha \approx \sin\alpha$, we can derive from equation (2) the relationships $$\sin\alpha = D/\sin\alpha = D_{max}/\sin\phi B\mathbf{max} \qquad (7)$$

whence, from equation (4), $$s/F = D = p \sin\phi/2F \sin\phi_{max} = a \sin\phi \qquad (8)$$

where $s$ represents the virtual deviation of the beam trace along the film which compensates for the advance of the frame.

Figure 7:
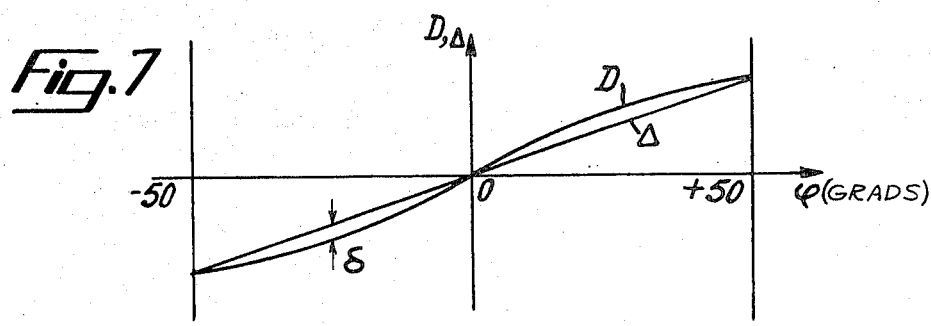

For the specific value $\phi_{max} = \phi/4$, the error $\delta = D - \Delta$ is given as $$\delta = (p/F)[(\sin\phi/\sqrt{2}) - (2\phi/\pi)] \qquad (9)$$

which vanishes only for $\phi = 0$ and $\phi = \pi/4$. This has been illustrated in FIG. 7 where D and $\Delta$ have been plotted against angle $\phi$ in the range between $-50$ and $+50$ grads.

Figure 8:
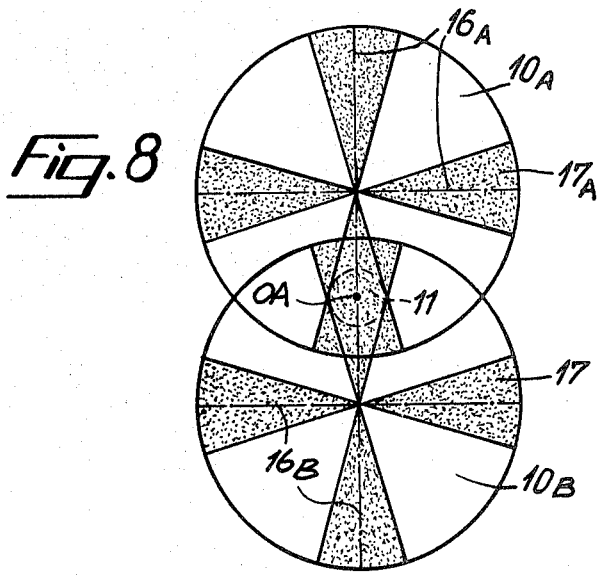
FIG. 8 is a face view of a pair of shutters to be used in a system according to my invention.

In FIG. 8 I have shown means for suppressing the spurious double image appearing upon the passage of the radial edge $16_A$ or $16_B$ between adjoining disk faces through the field of the beam 11. The disks $10_A$ and $10_B$ are provided for this purpose with opaque sectoral zones $17_A$ and $17_B$, preferably on their confronting flat surfaces. It will be apparent that the zones may be formed by a coating applied to the disks or that they could be constituted by a mask juxtaposed with each disk and rotatable therewith. It will thus be convenient to refer to these zones, collectively, as a pair of shutters. In the shutter position illustrated, the overlapping region of the disk is bisected by a pair of aligned edges $16_A$, $16_B$ passing through the optical axis OA. At this point the beam 11 is completely obstructed.

Figure 9:
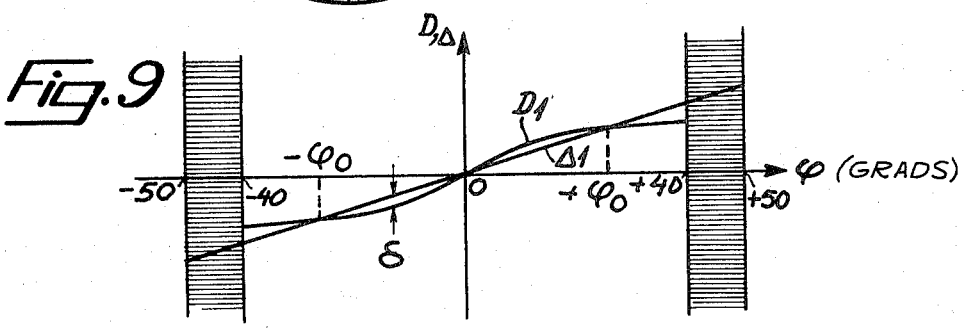
FIG. 9 is a modification of a graph of FIG. 7.

In the example chosen, each shutter zone extends over an arc of 20 grads so that, as shown in the graph of FIG. 9, the field of view falls within the range of $\pm 40$ grads. By substituting an angle $\phi_0$ within that range for $\phi_{max}$ in equation (8) we can further reduce the maximum error $\delta$.

Figure 10:
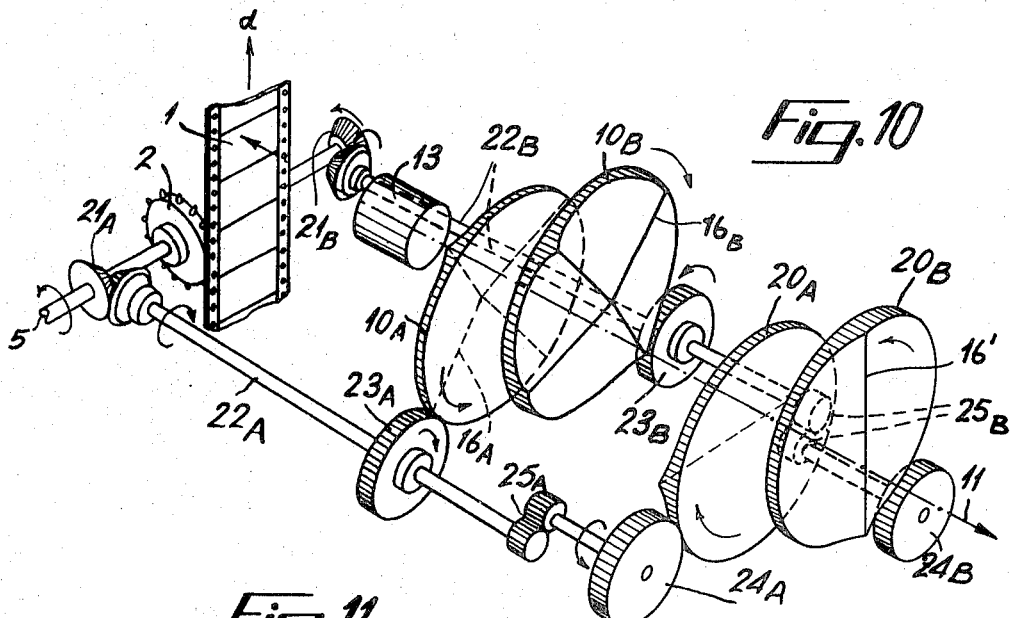
FIG. 10 is a somewhat diagrammatic perspective view of a motion-picture projector including a two-stage deflector according to the invention.

Even so, this error or divergence may be objectionably large if the pictures are to be projected on a large screen over a great distance and/or from a wide film. A further improvement in the linearity of the prism-induced deflection can be realized, pursuant to another feature of my invention, by the provision of a plurality of deflector stages as illustrated in FIG. 10. This Figure shows a first deflector stage consisting of two counterrotating disks $20_A$, $20_B$ in tandem with a second deflector stage consisting of two counterrotating disks $10_A$, $10_B$ in the path of beam 11. The two disk pairs are driven from sprocket shaft 5 by bevel-gear couplings $21_A$, $21_B$, shafts $22_A$, $22_B$, a first set of pinions $23_A$, $23_B$, in mesh with the toothed peripheries of disks $10_A$, $10_B$, respectively, reversing gears $25_A$, $25_B$, and a second set of pinions $24_A$, $24_B$ in mesh with the toothed peripheries of disks $20_A$ and $20_B$, respectively; the non-driven disks shafts, suitably journaled in the objective housing by bearings such as those shown in FIG. 5, have not been illustrated.

Each of the disks $20_A$, $20_B$ has a single pair of prism faces whereas each disk $10_A$, $10_B$ has four such faces, the latter disks being thus identical with those of the preceding embodiments. With all the disks rotating at the same speed, a face of disks $10_A$, $10_B$ moves past a given point (such as the axis of objective 13) in half the time required for a face of disk $20_A$, $20_B$ to do so. This has been illustrated graphically in FIG. 11 where curve $M_1$ represents the virtual deviation $s$ (in millimeters) introduced by the disks $20_A$, $20_B$ during a quarter of a revolution, i.e. throughout an angular range of 100 grads, whereas curve $M_2$ represents the corresponding deviation due to the disks $10_A$, $10_B$. Curve $M_1$ is a sine wave, according to equation (8), with a fundamental period of $2\pi$, or 400 grads, only a rising portion of its positive half-cycle having been illustrated; the curve jumps from its positive peak to its negative peak, as already explained, whenever the boundery between the two disk faces passes the optical axis. Curve $M_2$ is an analogous sine wave of half that period, skipping from a negative to a positive peak every quarter of a turn (at 50, 150 etc. grads).

Within the range of $\pm 50$ grads, in which the beam 11 is unblocked, the deviations $M_1$, $M_2$ are in phase opposition and generate a resultant deflection $M_3$ closely approximating a straight line.

Thus, the divergence $\delta$ from true linearity can be expressed in the two-stage system of FIG. 10 by $$\delta = a\sin\phi + b\sin 2\phi - m\phi \qquad (10)$$

which will be recognized as an extension of equation (9) with generalized coefficients. The first two terms of this equation are the beginning of a Fourier series and could be supplemented, with the addition of further stages, by any desired number of higher-order terms, i.e. $\sin 3\phi$ etc. In practice, of course, the number of such stages will be limited by the loss of luminous energy as the beam passes through each additional disk pair; I have found that two such stages will be sufficient for even the most exacting projection requirements.

The cut-off points at $\pm 50$ grads can be obtained by a masking of disks $20_A$ and $20_B$ over sectors extending for $\pm 50$ grads on either side of the dividing diameter $16'$ shown in FIG. 10; a further reduction of the range results from a partial masking of disks $10_A$ and $10_B$ over an arc of $\pm 10$ grads per sector as described in conjunction with FIG. 8 so that the actual operating range lies between $-40$ grads and $+40$ grads.

The coefficient $m$ in equation (10) has the same value as in equation (9), i.e. $2p/F\pi$; suitable values for coefficients $a$ and $b$ in equation (10) are $aF = 16.445$ mm and $bF = -2.178$ mm which, in the specific case of $F = 100$ mm and $p = 19$ mm, yields $$100\delta = 16.445\sin\phi - 2.178\sin 2\phi - (38\phi/\pi) \qquad (10')$$

representing the residual divergence of function $M_3$ from linearity. Equation (8) can be satisfied by substituting a value $p' = 2aF = 32.89$ for the actual value $p = 19$ and setting $\phi_{max} = 100$ grads (90°), with $\sin\phi_{max} = 1$.

A similar correction for the nonlinearity introduced by function $M_1$ can be obtained if disks $10_A$ and $10_B$ are rotated at half the speed of disks $20_A$, $20_B$, with replacement of curve $M_2$ by a curve $M_2'$ (dot-dash line in FIG. 11) having the same period as curve $M_1$ but being of opposite phase; a transmission for creating such a speed ratio has been illustrated in FIG. 24 described hereinafter.

If $\alpha_1$ and $\alpha_2$ are the apex angles of the primary and secondary prisms respectively defined by the disks $20_A$, $20_B$ and $10_A$, $10_B$ in FIG. 10, the numerical values of these angles can be calculated from the relationship (5), yielding $$\sin\alpha_1 = 0.16445$$

for the first Fourier term (since $a = p'/2F \sin\phi_{max}$) and, analogously for the second term, $$\sin\alpha_2 = 0.02178.$$

The maximum divergence $\delta$ from the linear function $\Delta = 38\phi/\pi$ equals, in this specific example, less than 0.01 mm.

Figure 11:
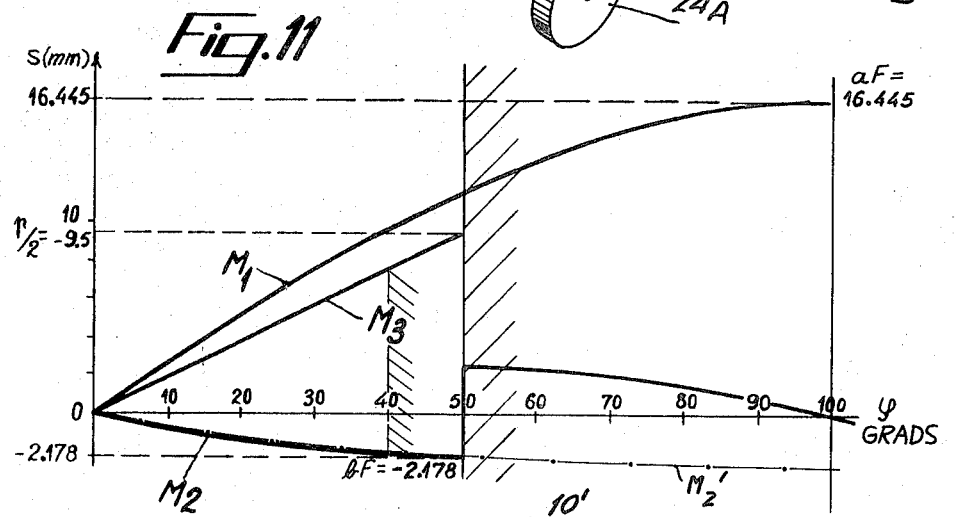
FIG. 11 is a graph relating to the system of FIG. 10.

From FIG. 11 it will be noted that only two diametrically opposite faces of disks $10_A$ and $10_B$ are optically effective, i.e. the ones aligned with the broad sides of dihedrals $20_A$ and $20_B$. Thus, the disks $10_A$ and $10_B$ need not be of four-sided pyramidal shape, as shown, but could be of conical or other configuration between their two active faces. Moreover, the relative position of the disk pairs in the beam path is immaterial and can be altered at will; care must be taken, however, to observe that the dihedral crests 16' of disks $20_A$ and $20_B$ bisect the angles included between the sector boundaries $16_A$, $16_B$ of disks $10_A$ and $10_B$ and that the peripheral disk motion in the region of the beam 11 should run counter to the direction of film motion $d$ in the case of the stages generating the first and all other odd-numbered Fourier terms but should be codirectional with that motion in the case of all other stages.

Figure 12:
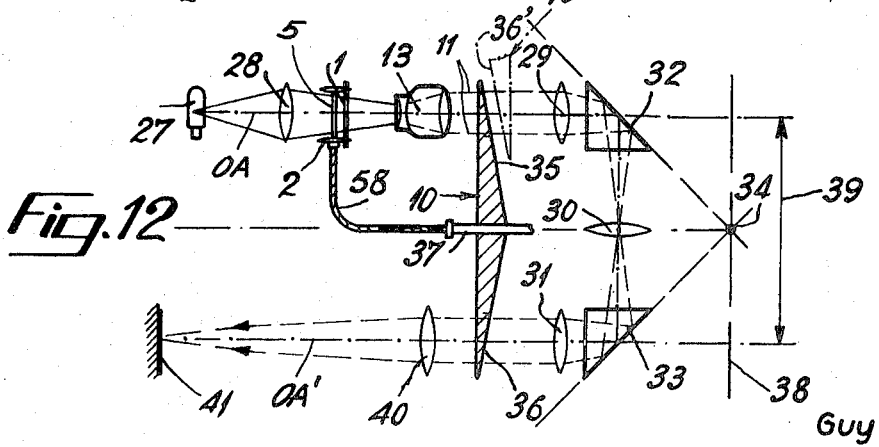
FIG. 12 is a cross-sectional view similar to FIG. 5, illustrating an autocorrelation system according to the invention.

In FIG. 12 I have illustrated an autocorrelation system in which a single disk 10 (per stage) is used to generate the compensatory beam deflection. This disk, assumed to be identical with the aforedescribed disks $10_A$ and $10_B$, is keyed to a shaft 37 midway between the optical axis OA of objective 13 and an axis OA' parallel thereto which defines a return path for the beam 11. The beam originates at a light source 27 whose rays are collected by a lens 28 and trained upon the film 1; a flexible link 58 positively connects the disk shaft 37 with the drive shaft 5 of the film transport 2. Objective 13 defocuses the rays passing through film 1 to create a telecentric field around disk 10. Beam 11, after traversing the transparent marginal zone of that disk, is refocused by a lens 29 and reflected by a prism 32 in a direction perpendicular to axis OA, i.e. parallel to a line 38 which passes through a point of intersection 34 of the disk axis with the oblique boundary of prism 32 including with that axis an angle of 45°. A second prism 33, symmetrical with reference to prism 32, deflects the beam along axis OA' back toward the disk 10 by way of a defocusing lens 31 identical with lens 29; the spacing 39 of axes OA and OA' is so chosen that a common focal point of lenses 29 and 31 lies in the disk axis at the center of a collective lens 30 having half the focal length of lenses 29 and 31. By this means the rays of beam 11 are transposed so that the outermost rays leaving the disk face 35 along the forward path become the innermost rays striking the disk face 36 on the return path, and vice versa. Another collective lens 40 beyond disk 10 focuses the returning beam onto a projection surface 41.

The second disk face 36 encountered by the beam 11 is the equivalent of a face 36' of an identical disk 10' (dot-dash lines) confronting the face 35 in overlapping relationship and counterrotating with reference thereto as previously described in connection with the paired disks $10_A$, $10_B$. The principles discussed in connection with the preceding embodiments apply, therefore, also to the modification of FIG. 12.

As schematically illustrated in FIG. 13, two disks 10 and 20 can be coaxially cascaded in the forward and return paths of beam 11 to minimize the divergence from precise linearity. Disks 10 and 20 rotate in opposite directions, for the reasons explained in connection with FIG. 10, on respective shafts 37 and 44. However, as illustrated in FIG. 14, it is also possible to design the optically effective surface of the second-stage disk 42 as an inverted pyramid or dihedral, with faces 43 of a slope opposite that of disk faces 35 and 36; in this case the two disks, rotating in the same sense, could be mounted on a common shaft, provided the effective width of each active face 43 of disk 42 is half that of the corresponding face 35, 36 of disk 10.

The concave, rather than convex, pyramidal or dihedral disk shape illustrated in FIG. 14 could also be used, if desired, in the case of counterrotating disks but, generally, will be practical only in the case of disks that are relatively shallow and have but a small number of faces.

The shallower secondary disks 20 and 42 of FIGS. 13 and 14 may have a number of faces different from that of the associated primary disks 10 if they are driven at the proper relative speed as described with reference to FIG. 11.

FIG. 15 shows that, for easier manufacture, a disk 51, 52 with four prism faces (equivalent to the disks $10_A$ and $10_B$ described above) can be made in the shape of a double dihedral with a crest 53 on one side, defining a pair of faces $51_a$, $51_b$, and an orthogonally extending crest 54 on the opposite side, defining a pair of faces $52_a$ and $52_b$. As shown, the disk may be composed of two identical halves 51, 52 cemented together in angularly offset relationship. Each quadrant of this disk has practically the same effect as a face of the four-sided pyramidal disks illustrated in preceding Figures.

It can be shown that, for a dihedral angle $\gamma$, the apex angle $\alpha$ of the several prisms in a four-sided pyramid equivalent to the refractive body 51, 52 is given by the relationship $$\sin \alpha/2 = \sin \gamma \sin \pi/4 \qquad (11)$$

In order to enable motion-picture projection at subnormal speeds without objectionable image flicker, the shutters of FIG. 8 may be replaced by a pair of shutters as shown in FIG. 16, with two sets of eight opaque sectors each, designated $57_A$ and $57_B$, on a pair of overlapping and counterrotating disks 55, 56 of the aforedescribed four-face type or their equivalent. Each sector $57_A$ and $57_B$ covers an arc of 25 grads and is so positioned as to block the beam both at the edges and in the center of the range depicted in FIG. 7. In this case, the on and off periods of the beam are of uniform duration. Since flicker is not a problem in the taking of pictures, the simpler shutter system of FIG. 8 will generally suffice in a camera even if the same is to be operated at, say, a rate of eight frames per second. In this way, therefore, slow-motion effects can be achieved and film can be saved in the filming of quiet scenes.

FIG. 17 shows part of a two-stage deflector, otherwise similar to that of FIG. 10, wherein the primary disks $61_A$, $61_B$ each have only a single prism face (effective in the manner described and with reference to FIGS. 25a – 25d and 26a – 26d) and co-operate with secondary disks $60_A$, $60_B$ of the dihedral type, similar to the primary disks $20_A$, $20_B$ of FIG. 10.

If the disks $61_A$, $61_B$ in FIG. 17 rotate at twice or four times the speed of disks $60_A$ and $60_B$, and if the direction of film motion $d$ is reversed, disks $60_A$ and $60_B$ will constitute the primary deflector stage. In that case, of course, the apex angles of their prism faces (i.e. their angles of inclination with reference to the plane of rotation) would have to be substantially larger than the corresponding angles of the secondary disks $61_A$ and $61_B$, as discussed in connection with FIG. 11.

Figure 18:
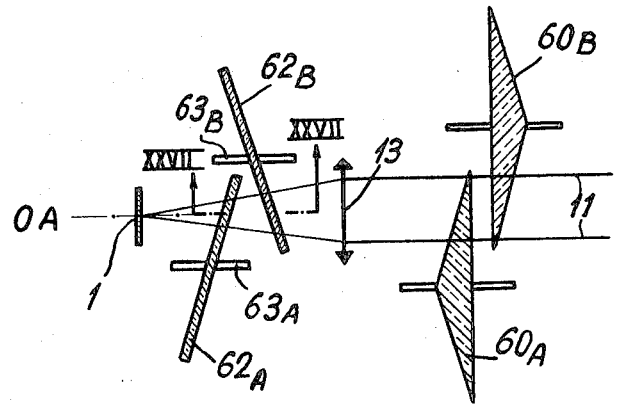
FIG. 18 is another diagrammatic view generally similar to FIGS. 13 and 14, illustrating a still further variant.

In FIG. 18 a primary deflector stage $60_A$, $60_B$ is supplemented by a secondary stage in the form of two counterrotating disks $62_A$, $62_B$ disposed obliquely on respective shafts $63_A$, $63_B$ which are parallel to the axis of objective 13, each of these latter disks being of the plane-parallel type. With objective 13 interposed between the two deflector stages, disks $62_A$ and $62_B$ lie in a field of nonparallel light rays between that objective and its primary focal plane coinciding with the film 1. As the parallel faces of these disks include equal and opposite angles with the axis OA in their positions of maximum relative inclination as projected upon the transverse plane of FIG. 18, their effects upon the beam 11 in that transverse plane cancel so that the beam experiences no transverse shift due to the disks $62_A$, $62_B$.

Figure 27:
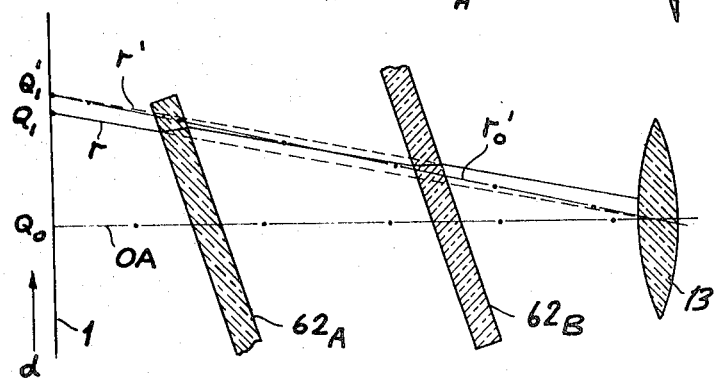

In the plane of motion, defined by the film track and the optical axis OA, the faces of these two disks are parallel to each other after every 180° of rotation in a position of maximum inclination with reference to a plane perpendicular to the axis. This has been illustrated in FIG. 27 showing the aspect of the disks in a position offset by a quarter turn from that of FIG. 18. Let us consider a spot on the film 1 which in the centered position of a frame lies at a point $Q_0$ on the axis OA and which in the position of FIG. 27, one-fourth of a revolution later, has moved to a point $Q_1$ in the direction of advance $d$. A ray $r$ from point $Q_1$, which in the absence of disks $62_A$, $62_B$ would pass through the center of the objective 13 (here shown schematically as a thin collective lens), is shifted parallel to itself upon successively traversing these disks so as finally to lie on a line $r'$ originating at a point $Q'$ whose distance from point $Q_0$ is slightly greater than that of point $Q_1$. Thus, point $Q_1'$ becomes the virtual origin of a cone of light rays centered on a virtual principal ray $r_0'$. This increased deflection represents a negative compensation of the type illustrated by the curve $M_2$ or $M_2'$ in FIG. 11. Thus, disks $62_A$, $62_B$ are the equivalent of the disks $61_A$, $61_B$ (FIG. 17) operating as a second deflector stage. If disks $60_A$, $60_B$ are of dihedral shape, as in FIG. 17, disks $62_A$, $62_B$ should rotate at least at twice their speed to provide the desired correction for nonlinearity. Again, both disk pairs may be partly opaque to act as periodically opening shutters. Since plane-parallel plates must be relatively thick to be optically effective, they introduce considerable distortion which rules out their use as primary deflectors, aside from the fact that their angle of deflection is not of the proper sign for use in any stage generating an oddnumbered term of a Fourier series.

Figure 28:
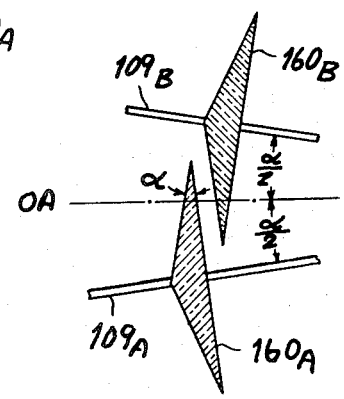

In this and other embodiments, the axis of the prismatic disk need not be parallel to the optical axis OA but could be symmetrically inclined with reference thereto. This has been illustrated in FIG. 28 which shows a pair of disks $160_A$, $160_B$ whose shafts $109_A$, $109_B$ include angles of $\pm\alpha/2$ with that axis ($\alpha$ being again the apex angle of each elemental prism) to reduce the transverse shift experienced by the beam in the centered position of a frame.

Figure 19:
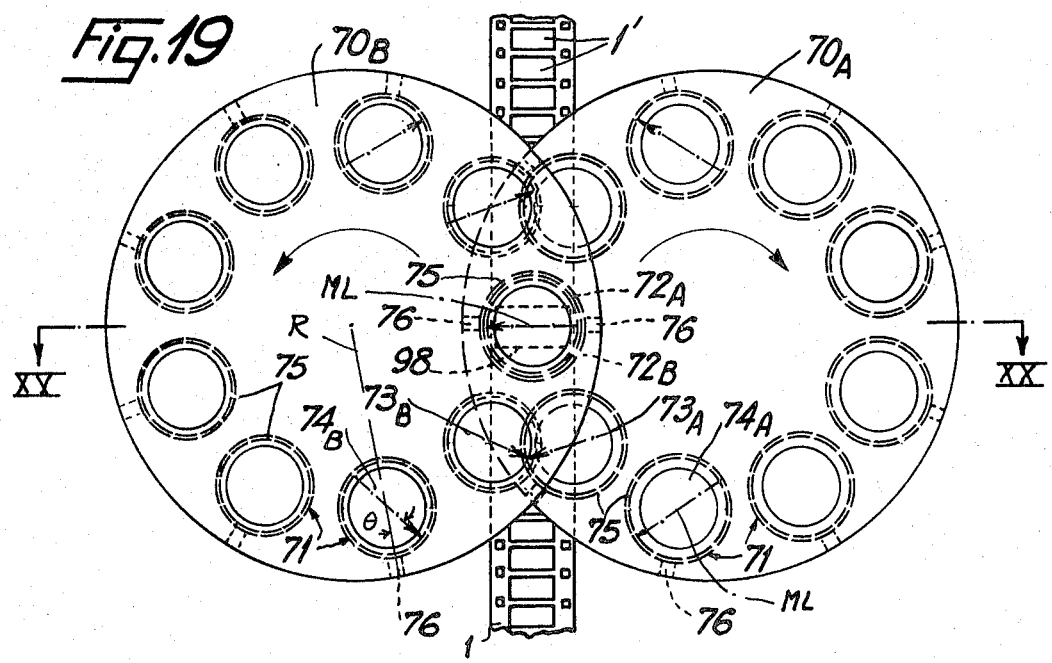
FIG. 19 is a face view similar to FIG. 4, illustrating still another embodiment.
Figure 20:
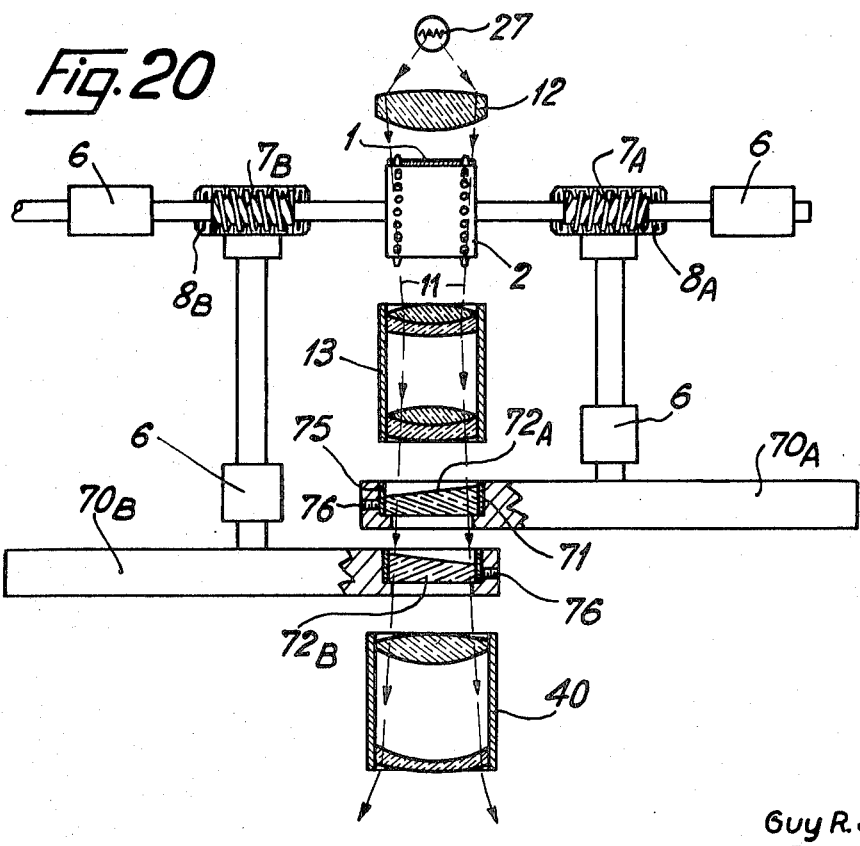
FIG. 20 is a cross-sectional view taken on the line XX — XX of FIG. 19.

Reference will now be made to FIGS. 19 and 20 which show a more elaborate system of the general type described above wherein the individual disks of the preceding embodiments, rotating about their own axes, have been replaced by counterrotating arrays of prismatic transparencies inserted in peripherally equispaced cutouts 71 of a pair of disk-shaped opaque carriers $70_A$, $70_B$. In the embodiment shown, each disk $70_A$, $70_B$ carries eight prismatic inserts $72_A$, $73_A$, $74_A$, etc. and $72_B$, $73_B$, $74_B$, etc. mounted in their cutouts with the aid of elastic split rings 75 and setscrews 76; each insert may therefore be angularly adjusted so that its median line ML (i.e. the direction of greatest slope) may include any desired angle $\theta$ with the associated disk radius R.

With the carrier disks $70_A$, $70_B$ partly overlapping in the same general manner as the individual disks of preceding Figures, the orbits of their prismatic inserts intersect in the active plane defined by the optical axis and the direction of film motion. In the specific position illustrated in FIGS. 19 and 20, prisms $72_A$, $72_B$ are in registry and intercept the beam 11 transluminating the film 1. Light source 27 and optical components 12, 13 and 14 have the same significance as in FIGS. 5 and 12.

The registering prisms $72_A$, $72_B$ have their median line ML coinciding and perpendicular to the film track in relatively inverted positions so as to introduce zero deflection; this coincides with a centering of a frame $1'$ and corresponds to the disk position illustrated in FIGS. 25a and 26a. It will be noted that the median line ML of these two inserts lie on respective disk radii, i.e. $\theta = 0$. Angle $\theta$ increases progressively for the disks $73_A$, $73_B$ and $74_A$, $74_B$ next in line, as seen in the direction of rotation, this increase being equivalent to an incremental change of the angle of rotation $\phi$ discussed herein above. A diaphragm 98 with a rectangular frame opening masks the portions of the prisms remote from the optical axis; such a diaphragm could, of course, also be used in the other embodiments. Lamp 27 may be flashed intermittently to transluminate the film 1 only during periods in which the diaphragm opening registers fully with a pair of adjacent prisms.

FIG. 21 shows the linear deviation $s_0$ of the beam, due to the continuous advance of the film, plotted against the angle of rotation of the carrier disks $70_A$, $70_B$ in grads. A curve $s_3'$, illustrated only in part, follows the same sinusoidal law as curve $M_1$ in FIG. 11, except that its coefficient $a_3F$ equals +1.705. A similar curve $s_3$ is shifted with reference to curve $s_3'$ by an angle $\theta_3 = 7.26$. If the carrier disks of FIGS. 19 and 20 are each provided with 20 prismatic inserts, a full disk revolution will be subdivided into 20 periods of 20 grads each, five of them having been indicated at $P_1 - P_5$ in FIG. 21. During a part of each period, e.g. over an angle of 2- grads at the beginning and at the end thereof, the beam remains suppressed between flashes of light sources 27 and/or by the action of a shutter not shown. Thus, a picture is projected during successive intervals of 15 grads each centered on the positions of 10, 30, 50, etc. grads. The example of FIG. 21 applies to a film of super-8 type with $p = 4.234$mm.

A small section of curve $s_3$, intersecting the line $s_0$ at two points G and H, deviates only slightly from that line between and just beyond these two points within the period $P_3$. As more clearly seen in FIG. 22, the divergence $\delta$ ranges from $-3\mu$ at the beginning of the active part of period $P_3$ (42.5 grads) through a value of $+2\mu$ in the middle of that period (50 grads) to a value of $-7\mu$ at the end (57.5 grads).

In an analogous manner a curve $s_5$ hugs the line $s_0$ between points U and V in period $P_5$ for a nearly perfect compensation of the beam deviation in the interval ranging between 82.5 and 97.5 grads; curve $s_5$ has a coefficient or peak value $a_5F = 2.117$ and an offset angle $\theta$ of about 28.6 grads.

In like manner, similar curves can be established to approximate the sections of line $s_0$ lying within the active portions of periods $P_1$, $P_2$ and $P_4$.

The specific values for the deviation $s$ at points G and H, in the example chosen, are $s_G = 0.9527$mm and $s_H = 1.0585$mm. The general formula for the curves of FIG. 21 is $$s = FD = aF\sin(\phi-\theta) \quad (12)$$

which yields, upon substitution of the above-indicated value of $a_3F = 1.705$, the magnitude $\tan\theta_3 = 0.1145$ corresponding to the value of 7.26 grads.

According to equation (8), $D_{max} = a$ for $\sin\phi_{max} = 1$. Thus, the apex angle $\alpha$ of the two inserts generating the curve $s_3$ may be determined from the relationship $$\alpha = a/2(n-1) \quad (13)$$

derived from equation (5) whence, with $F = 35$mm and $n = 1.52$, $d_3$ is found to equal 0.0468 radians or 2.98 grads.

With 20 inserts per disk, as assumed in the discussion of the graph of FIG. 21, a group of ten consecutive inserts of each disk will traverse the optical axis during a frame period so that the film 1 advances a distance of $2p$ in the course of a disk revolution. On the other hand, the arrangements shown in FIGS. 19 and 20 could also be used with all the inserts identically oriented (with reference to the respective disk radii R), the passage of successive inserts through the field of the beam then occuring during consecutive frame periods.

As illustrated in FIG. 23, the technique of autocorrelation employed in the system of FIG. 12 can also be utilized in an arrangement of the general type shown in FIGS. 19 and 20, a single carrier disk 79 with transparent inserts 90 being mounted on a shaft journaled in a bearing 80 and driven by a motor 82 via a belt 81. The disk shaft carries a notched wheel 83 engaged by a toothed belt 84 which also meshes with a notched wheel 85 on the shaft of a film-feeding sprocket 86. The beam projected onto the film 1 from source 27 by way of entrance pupil 28 is deflected by a prism 87 onto the defocusing objective 13 and, after traversing a prismatic insert $90_A$ in a cutout 71 of disk 79, passes through the aforedescribed components 29, 32, 30, 33, 31 and another prismatic insert $90_B$ to a further prism 91, thereafter exiting by way of a lens group 108, a diaphragm 109 and a further lens group 110 jointly representing the objective 40 of FIG. 12. The operation of this system will be readily understood from the preceding explanations.

FIG. 24 shows two pairs of counterrotating disks $96_A$, $96_B$ and $97_A$, $97_B$ forming cascaded deflector stages as previously discussed in conjunction with FIGS. 10 and 17. THe sprocket shaft 5 of film transport 2 is operated from a motor 92 via a shaft $93_A$, a pair of bevel gears $99_A$ and a notched-belt transmission 100; shaft 5, through a similar transmission 107, drives a flasher 118 for the lamp 27.

Input shaft $93_A$ also powers a parallel shaft $93_B$ through bevel gears $99_A$ and another pair of such gears $99_B$, the torque of these shafts being further transmitted to the pairs of counterrotating disks through notched-belt transmissions $94_A$, $94_B$ and $95_A$, $95_B$. It will be noted that the transmission ratio of belts $94_A$, $94_B$ is half that of belts $95_A$, $95_B$ and that the number of inserts in the cutouts 71 of disks $96_A$, $96_B$ is twice that of disks $97_A$, $97_B$. Thus, the latter pair of disks may be considered a first deflector stage, generating a curve similar to that shown at $M_1$ in FIG. 11, whereas disks $98_A$, $98_B$ form an associated second stage generating a corrective function comparable to curve $M_2'$. If the two disk pairs were driven at the same period, the operation of the system of FIG. 24 would be analogous to that of FIG. 10.

If the shutters of FIGS. 8 and 16 are translucent rather than opaque, the constant illumination of the projection screen eliminates flicker even if the partial suppression of the beam occurs at less than the normal minimum rate of about 16 times per second. Such a slow-rate reproduction can be used, in particular, for teaching and advertising purposes as well as for the study of motions.

Since the diameter of the disks (especially in the embodiments of FIGS. 19–24) can be freely chosen, films of any width (e.g. up to 70 mm) may be exposed and transluminated in the manner herein disclosed. A maximum divergence of one-third angular minutes or 0.01 radians from linearity, realizable with the present system, corresponds to a positional error of one millimeter over a projection distance of 10 meters.

I claim:

1. An optical system for focusing a beam of light upon a motion-picture film divided into a succession of longitudinally adjoining image frames, comprising:
    a source of light;
    focusing means for forming light rays from said source into a beam centered on an optical axis;
    continuously operable transport means for a motion-picture film to be illuminated, with continuous displacement of said film along a track in a focal plane of said focusing means and with periodic centering of a frame of said film on said axis at a predetermined rate;
    a progressively variable beam deflector in the path of said beam, said deflector including a rotatable disk with at least one side generally perpendicular to said axis, said disk having diametrically opposite conjugate transparent peripheral portions positioned for successive traversal by said beam, at least one side of said disk being inclined at different angles to the beam path in different rotary positions of said disk whereby an exiting section of said beam is deflected to a varying extent relative to said axis in peripheral direction of said disk, said peripheral direction being substantially parallel to said track, said focusing means including a pair of symmetrical reflectors in line with said diametrically opposite portions for reversing the direction of said beam and guiding it partly at right angles to said axis, a pair of symmetrical collective lenses between said disk and said reflectors for focusing said beam onto a point in line with said axis, and a central collective lens at said point, said lenses transposing the rays of said beam between said diametrically opposite portions; and drive means for said disk synchronized with said transport means for rotating said disk through a full revolution during a whole number of frame periods and with zero deflection of said exiting section in the centered position of a frame, the angular swing of said inclined side with reference to said axis being so chosen as to make the deflection of said exiting section substantially equal to the offset of a frame from said axis in other positions of the film.

2. A system as defined in claim 1 wherein said disk means comprises at least one pair of counterrotating disks with overlapping marginal regions, said conjugate portions being part of said marginal regions.

3. A system as defined in claim 1 wherein said symmetrical lenses are located in a region of parallel light rays of said beam established by said focusing means.

4. A system as defined in claim 1 wherein said disk means comprises a disk with at least a transparent part having a prism face inclined at a small angle to its plane of rotation, said face being at least intermittently interposable in the path of said beam.

5. A system as defined in claim 1 wherein said disk means comprises a disk with a plurality of transparent parts having prism faces inclined at small angles to its plane of rotation, said faces being successively interposable in the path of said beam.

6. A system as defined in claim 5 wherein said disk is provided with opaque portions separating said transparent parts.

7. A system as defined in claim 6 wherein said disk is provided with a plurality of peripherally equispaced cutouts, said transparent parts being prismatic inserts seated in said cutouts.

8. A system as defined in claim 7 wherein said inserts are of circular outline.

9. A system as defined in claim 8 wherein a group of peripherally consecutive inserts of different apex angles and different angular orientation relative to corresponding disk radii are positioned to register with said optical axis during a single frame period.

10. An optical system for focusing a beam of light upon a motion-picture film divided into a succession of longitudinally adjoining image frames, comprising:
a source of light;
focusing means for forming light rays from said source into a beam centered on an optical axis;
continuously operable transport means for a motion-picture film to be illuminated, with continuous displacement of said film along a track in a focal plane of said focusing means and with periodic centering of a frame of said film on said axis at a predetermined rate;
a progressively variable beam deflector in the path of said beam, said deflector including rotatable disk means with sides generally perpendicular to said axis, said disk means having at least two conjugate transparent peripheral portions positioned for successive traversal by said beam, at least one side of said disk means being inclined at different angles to the beam path in different rotary positions of said disk means whereby an exiting section of said beam is deflected to a varying extent relative to said axis in peripheral direction of said disk means, said peripheral direction being substantially parallel to said track, said disk means comprising at least one first-stage disk and at least one second-stage disk disposed in tandem in the path of said beam for deflecting said beam in two mutually opposite directions in line with said track, said second-stage disk comprising a plane-parallel plate disposed in a field of nonparallel light rays of said beam established by said focusing means, the deflection due to said first-stage disk substantially exceeding the deflection due to said second-stage means, said deflections substantially corresponding to the first two terms of a Fourier development of a linear function representing the offset of a frame from said axis; and
drive means for said disk means synchronized with said transport means for rotating said disk means through a full revolution during a whole number of frame periods and with zero deflection of said exiting section in the centered position of a frame, the angular swing of said inclined side with reference to said axis being so chosen as to make the deflection of said exiting section substantially equal to the offset of a frame from said axis in other positions of the film.

11. An optical system for focusing a beam of light upon a motion-picture film divided into a succession of longitudinally adjoining image frames, comprising:
a source of light;
focusing means for forming light rays from said source into a beam centered on an optical axis;
continuously operable transport means for a motion-picture film to be illuminated, with continuous displacement of said film along a track in a focal plane of said focusing means and with periodic centering of a frame of said film on said axis at a predetermined rate;
a progressively variable beam deflector in the path of said beam, said deflector including rotatable disk means with a multiplicity of peripherally equispaced circular cutouts and with prismatic transparent inserts seated in said cutouts, said inserts being divided into two groups of conjugate prisms positioned for successive traversal by said beam, peripherally consecutive inserts being of different apex angles and different angular orientation relative to corresponding disk radii whereby an exiting section of said beam is deflected to a varying extent relative to said axis in peripheral direction of said disk means, said peripheral direction being substantially parallel to said track; and
drive means for said disk means synchronized with said transport means for rotating said disk means through a full revolution during a whole number of frame periods and with zero deflection of said exiting section in the centered position of a frame, the range of said apex angles being so chosen as to make the deflection of said exiting section substantially equal to the offset of a frame from said axis in other positions of the film.

12. A system as defined in claim 11, wherein said conjugate portions are diametrically opposite parts of a single disk, said focusing means including optical means for reversing the direction of said beam and transposing its rays between traverses of said portions.

* * * * *